(12) United States Patent
Haiplik

(10) Patent No.: US 7,777,457 B2
(45) Date of Patent: Aug. 17, 2010

(54) CONSTANT FREQUENCY CURRENT-MODE BUCK-BOOST CONVERTER WITH REDUCED CURRENT SENSING

(75) Inventor: Holger Haiplik, Swindon (GB)

(73) Assignee: Wolfson Microelectronics plc, Edinburgh (GB)

( * ) Notice: Subject to any disclaimer, the term of this patent is extended or adjusted under 35 U.S.C. 154(b) by 274 days.

(21) Appl. No.: 11/905,822

(22) Filed: Oct. 4, 2007

(65) Prior Publication Data

US 2008/0303502 A1 Dec. 11, 2008

(30) Foreign Application Priority Data

Jun. 7, 2007 (GB) .................................. 0711008.3

(51) Int. Cl.
*G05F 1/652* (2006.01)
*G05F 1/656* (2006.01)

(52) U.S. Cl. ........................ 323/222; 323/224; 323/259; 323/284

(58) Field of Classification Search .................. 323/222, 323/224, 225, 259, 282, 284
See application file for complete search history.

(56) References Cited

U.S. PATENT DOCUMENTS

| 6,166,527 | A * | 12/2000 | Dwelley et al. ............. 323/222 |
| 6,191,567 | B1 * | 2/2001 | Sluijs ........................ 323/259 |
| 6,348,779 | B1 * | 2/2002 | Sluijs ........................ 323/222 |
| 6,348,781 | B1 | 2/2002 | Midya et al. |
| 6,737,838 | B2 * | 5/2004 | Sluijs et al. ................. 323/225 |
| 6,812,676 | B2 * | 11/2004 | Tateishi ...................... 323/225 |
| 6,984,967 | B2 * | 1/2006 | Notman ...................... 323/282 |
| 7,256,570 | B2 * | 8/2007 | Zhou et al. .................. 323/224 |
| 7,394,231 | B2 * | 7/2008 | Flatness et al. ............. 323/259 |
| 2006/0055384 | A1 * | 3/2006 | Jordan et al. ................ 323/282 |
| 2006/0176036 | A1 * | 8/2006 | Flatness et al. ............. 323/282 |
| 2006/0176037 | A1 * | 8/2006 | Flatness et al. ............. 323/282 |
| 2006/0176038 | A1 | 8/2006 | Flatness et al. |

FOREIGN PATENT DOCUMENTS

| EP | 1 689 070 | 8/2006 |
| WO | WO 2007/099174 | 9/2007 |

* cited by examiner

*Primary Examiner*—Bao Q Vu
(74) *Attorney, Agent, or Firm*—Dickstein Shapiro LLP

(57) ABSTRACT

A converter including an inductor (L), a first switch (SW1, S1) connected between an input terminal ($V_{in}$) and the inductor, a diode/switch (D1, S2), connected between the first end of the inductor and ground, a diode/switch (D2, S3) connected between the inductor and an output terminal ($V_{out}$), and a second switch (SW2, S4) coupled between inductor and ground. A current sensor senses current in the first switch (SW1, S1) as a measure of inductor current. Waveform generators (31, 32) generate buck and boost slope compensation ramps (RMP-BUCK, RMP-BOOST). Control logic (10) opens and closes the switches every clock period at individual duty cycles determined using a feedback signal derived from the output terminal, the sensed current and the slope compensation ramps. The slope compensation ramps are mutually offset such that current sensing is needed only while the first switch (SW1, S1) is closed.

21 Claims, 7 Drawing Sheets

CONSTANT FREQUENCY CURRENT-MODE BUCK-BOOST CONVERTER WITH REDUCED CURRENT SENSING

The present invention relates to buck-boost converters and controllers for the same, as well as to a method of controlling a buck-boost converter. More particularly, the present invention concerns constant-frequency current-mode buck-boost converters.

BACKGROUND OF THE INVENTION

Buck-boost converters are gaining in popularity. Recent applications include portable media players featuring hard disk drives that require a supply voltage of typically 3.3V where output voltages of the batteries most commonly used in portable devices are ranging from 4.2V down to below 3.0V. To be able to make the most of the batteries it is apparent that a voltage regulator is needed that can generate a supply voltage for such components that can either be below, above or equal to the battery voltage. A buck-boost converter does just that.

Buck-boost converters have been known for a long time. A simple non-inverting type converter consists of two switches, two diodes, some sort of modulator to control the switches, an inductor and an output capacitor (see FIG. 1). In the traditional switching scheme the two switches SW1, SW2 are opened and closed at the same time under control of a switch controller 10. By pulse-width modulation, that is by changing the duty cycle of this switching scheme, the output voltage $V_{out}$ can be held constant with input voltages $V_{in}$ that are above, below or equal to the output voltage. In other words, a buck-boost converter can act either as a buck converter (input voltage above output voltage), a boost converter (input voltage below output voltage) or as a combination of both according to the control signals applied to it from the switch controller 10. The combination of both types of control is generally applied when the input voltage is approximately equal to the desired output voltage.

Current-mode converters can exhibit sub-harmonic oscillation in the current domain, and slope compensation is generally employed to combat that phenomenon. This involves adding an extra compensating slope to the signal representing the current flowing in the inductor. Any sub-harmonic oscillation is thereby suppressed quickly. Peak current control and valley current control are control modes which may be used.

To understand how the converter of FIG. 1 works let's look at the case where the input voltage $V_{in}$ is the same as the target output voltage $V_{out}$. Let's assume further that this converter works at a constant switching frequency and that the switches and diodes D1, D2 have no resistance. If we now assume that the two switches SW1, SW2 are closed for a time of duration t1 the current in the inductor will flow through the switches and rise according to $$dI/dt1 = Vin/L,$$

where L is the inductance of the converter. In the remaining portion of a clock period the switches will be open for t2 and the current in the inductor will continue to flow through the two diodes D1 and D2 and decrease according to $$dI/dt2 = -Vout/L.$$

In steady-state operation (stable operating point) the current at the beginning and the end of a clock period needs to be the same. If $V_{in}=V_{out}$ that means that t1=t2 (see FIG. 3), or in other words a duty cycle D of 0.5.

It can be seen that in this switching scheme current will only be delivered to the output during, in this example, half of the clock cycle, namely when the two switches SW1, SW2 are open. This means, however, that if the load demands a certain amount of current and the DC output voltage is to be held constant, the converter needs to deliver two times that load current when only delivered to the output for half of the clock cycle. Not only does that reduce the efficiency of the converter considerably, in comparison with a simple buck or boost converter, but it also requires a larger inductor due to the larger peak current. This makes this approach not very attractive in a market where users demand smaller devices that they can use for longer.

Attempts have been made to the address the above issues with buck-boost converters based on both voltage-mode and current-mode topologies.

In particular, there has been proposed a buck-boost converter based on a current-mode topology which uses a mixed peak- and valley-current control method called valley-peak current-mode control. In this scheme the converter needs the ability to measure the inductor current at any time during the complete period. In one circuit configuration, this is achieved by adding a sense resistor in a common current path. This adds cost and reduces efficiency. In another arrangement, two current sense circuits are used to sense the current flowing in either of two of the converter switches (corresponding to S2 and S4 in FIG. 2). This adds to the overall circuit complexity, occupied area, and cost.

Consequently, there is a need for improved current control in a buck-boost converter wherein the inductor current is sensed cheaply and effectively.

SUMMARY OF THE INVENTION

According to a first aspect of the present invention, there is provided a method of controlling a constant-frequency current-mode buck-boost converter, the buck-boost converter including an inductor, a first switch connected between an input terminal of the converter and a first end of the inductor, a first current control means connected between the first end of the inductor and ground, a second current control means connected between a second end of the inductor and an output terminal of the converter, and a second switch coupled between the second end of the inductor and ground; the method comprising:

deriving a feedback signal from the output terminal;

sensing a signal representative of current in the inductor to provide a sensed current signal;

providing first and second ramp signals, the first ramp signal for use in controlling buck operation through at least the first switch, the second ramp signal for use in controlling boost operation through at least the second switch; and generating drive signals to repeatedly open and close at least the first switch and second switch at individual duty cycles determined on the basis of the feedback signal, the sensed current signal and the first and second ramp signals; wherein the first and second ramp signals are mutually offset to one another in time, in such a way as to allow said sensing step to be performed only while the first switch is closed.

According to a second aspect of the present invention, there is provided a controller for a constant-frequency current-mode buck-boost converter including an inductor, a first switch connected between an input terminal of the converter and a first end of the inductor, a first current control means connected between the first end of the inductor and ground, a second current control means connected between a second end of the inductor and an output terminal of the converter, a second switch coupled between the second end of the inductor and ground, and current sensing means for sensing a signal representative of current in the inductor to provide a sensed current signal, the controller comprising:

feedback means for deriving a feedback signal from the output terminal;

a waveform generator for generating first and second ramp signals, the first ramp signal for use in controlling buck operation through at least the first switch, the second ramp signal for use in controlling boost operation through at least the second switch; and control logic for generating drive signals to repeatedly open and close at least the first switch and second switch at individual duty cycles determined on the basis of the feedback signal, the sensed current signal and the first and second ramp signals; wherein the waveform generator is arranged to provide the first and second ramp signals mutually offset with respect to one another; and the control logic is arranged to employ the sensed current signal only while the first switch is closed.

According to other aspects of the present invention, there is provided a buck-boost converter having the above-defined controller, and a system incorporating this buck-boost converter.

An embodiment of the present invention can provide a constant frequency current-mode buck-boost converter which is able to provide a constant output voltage while maintaining a high efficiency with input voltages that are higher, lower or equal to the input voltage. It does not need any extra components to do that and senses the current without impacting efficiency. A single current-sense circuit, which is normally present in a buck-boost converter in any case, can be employed to sense the current in a single switch of the converter, by configuring the switch controller to supply control signals such that this switch is always closed at the required timings for current sensing.

BRIEF DESCRIPTION OF THE DRAWINGS

Reference is made, by way of example only, to the accompanying drawings in which.

DETAILED DESCRIPTION OF THE INVENTION

Figure 1:
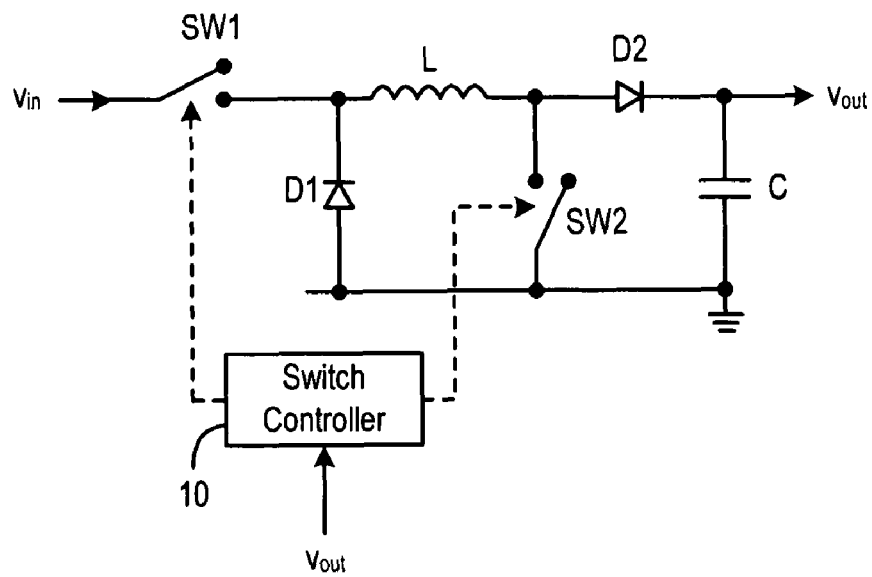
FIG. 1 shows the circuit diagram of a known two-switch, two-diode buck-boost converter.
Figure 2:
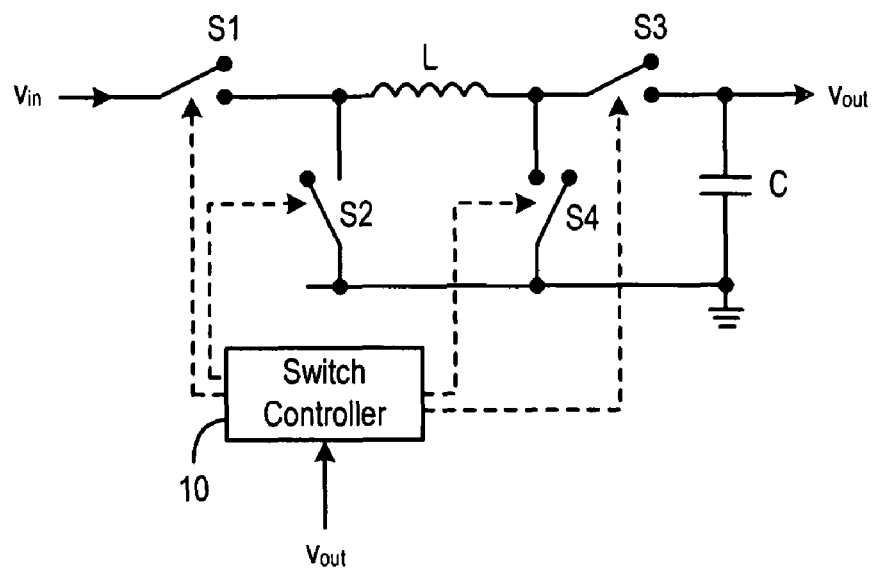
FIG. 2 shows the circuit diagram of a known four-switch buck-boost converter.
Figure 3:
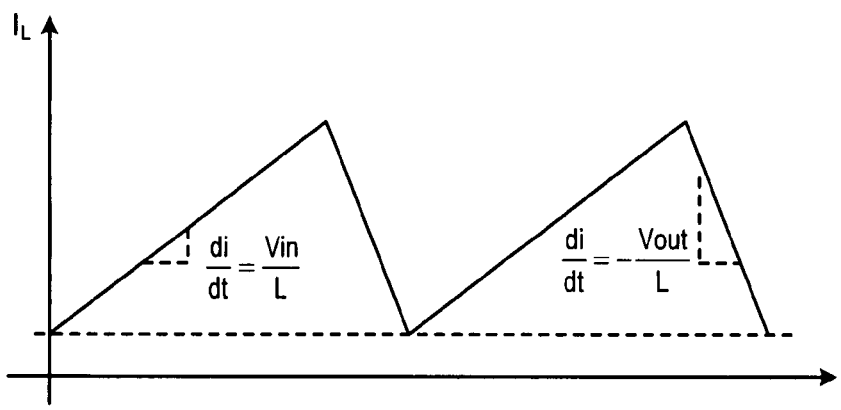
FIG. 3 shows an inductor current waveform for the known buck-boost converter of FIG. 1 or FIG. 2.

Embodiments of the present invention will now be described with reference to a four-switch type buck-boost converter as shown in FIG. 2. This buck-boost converter is modified from that shown in FIG. 1 in that the two diodes D1 and D2 of FIG. 1 are replaced by switches. Thus, the switches labelled S1, S2, S3 and S4 in FIG. 2 correspond to SW1, D1, D2 and SW2 of FIG. 1 respectively. In this case, S2 and S3 can be viewed as synchronous rectifiers.

The present invention can be applied to either configuration of buck-boost converter shown in FIG. 1 or FIG. 2. It is also possible to configure a buck-boost converter with three switches and one diode; for example, S3 of FIG. 2 could be replaced by a diode. The switch or the diode located in the positions of D1 and D2 in FIG. 1 may collectively be referred to as a current control means. MOS transistors, the gates of which are coupled to the switch controller 10 for receiving control signals, are preferably employed as the switches. Although FIGS. 1 and 2 illustrate non-inverting buck-boost converters which are generally preferred in real-world applications, inverting-type converters can be configured with fewer switching components or diodes. The present invention is also applicable to such configurations.

Typically, such a converter is operated at a predetermined clock frequency, yielding a constant-frequency current-mode buck-boost converter. The constant frequency current-mode buck-boost converter of the present invention uses a modified peak-valley current mode control scheme that differs from the schemes known in the art (see above) in some important aspects.

The easiest way to look at the buck-boost converter of the present invention is to think of it as two independent converters, a buck and a boost converter. Taking the circuit topology of FIG. 2 as an example, the buck converter topology can be considered to include switches S1 and S2, whilst the boost converter topology essentially involves the switches S3 and S4. Buck-boost operation in effect superimposes operation of the buck converter on operation of the boost converter. For example, the buck converter could be operated with a 90% duty cycle at the same time as applying a small amount of boost, such as is provided by a 5% duty cycle of the boost converter.

Figure 4:
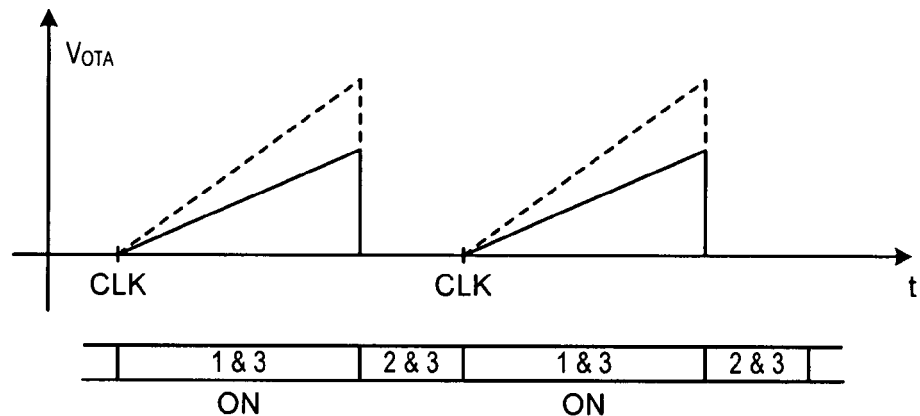
FIG. 4 shows an example for the peak-current control scheme used for the buck-part of operation of the known buck-boost converter.
Figure 5:
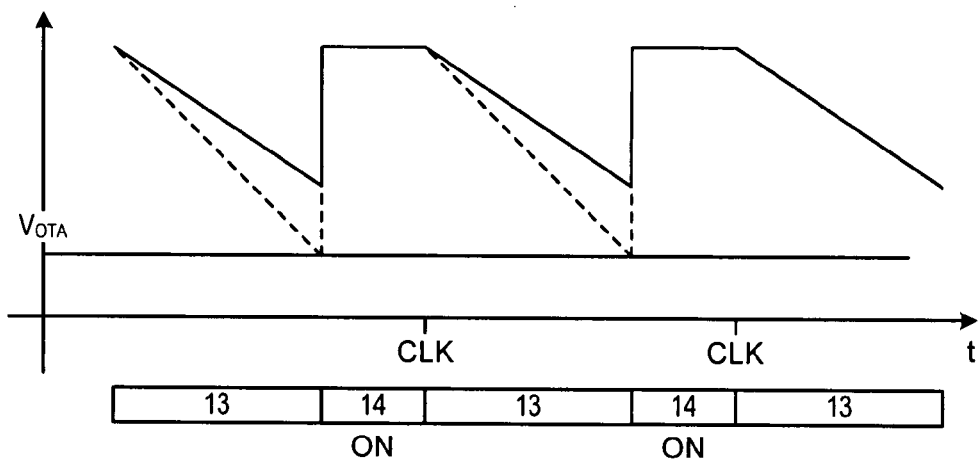
FIG. 5 shows an example for the valley-current control scheme used for the boost-part of operation of the known buck-boost converter.

The buck converter topology uses a peak-current control scheme which is schematically illustrated in FIG. 4. The boost converter topology uses a valley-current control scheme as shown in FIG. 5. As will be explained later, peak-current and valley-current control both involve comparing a signal derived from the output voltage with the sum of a signal representing inductor current and a ramp waveform (slope compensation ramp), the result of the comparison being used to determine when to open and close the switches of the converter. The solid lines in FIGS. 4 and 5 indicate the voltage (or current) across the inductor and the dashed lines indicate the addition of the inductor voltage with the ramp voltage.

The waveforms in each case repeat within a clock period defined by brief clock pulses, indicated by marks CLK along the time axis, and applied to the switch controller 10 (FIG. 1 or 2) of the buck-boost converter.

Whilst the inductor current can be detected directly, for example using a resistor coupled to the inductor coil, this is not preferable as it generally necessitates additional external components. It is more practical to detect the inductor current indirectly by measuring the current flow through one of the converter switches (S1 to S4 in FIG. 2). Obviously such a current only flows when the switch is closed (on).

In FIG. 4, the numbers underneath the voltage graph further indicate which switches are currently closed (on), and for how long within each clock period. Thus, "1&3" indicates that both switches S1 and S3 in FIG. 2 are closed during the first two-thirds or so (in this example) of each clock period, the other switches being open at this time. Then, for the remainder of the clock period, "2&3" shows that S1 is opened and S2 closed. In FIG. 5 and later Figures, the "&" is omitted so that "13" denotes S1 and S3 both being closed.

The reason this scheme is advantageous can be explained as follows: if the input voltage is higher than the output voltage, by the time it approaches the output voltage the duty cycle of the buck converter needs to be able to approach 100%. This can be achieved with a peak-current control scheme, because here the buck converter cycle is started every clock cycle and if it is not stopped by the modulator until the sum of the signal representing inductor current plus the ramp waveform (slope compensation ramp) is equal to the signal derived from the output voltage. If this signal gets higher the converter will naturally reach 100% duty cycle (FIG. 4). Once the input voltage has nearly reached the output voltage the boost converter needs to start supporting the buck converter.

The minimum boost converter duty cycle should be as small as possible, which can be achieved with a valley-current control scheme because the boost converter cycle is stopped every clock cycle by the switch controller (modulator). So if the duty cycle had just been started before the clock cycle it can be stopped by the modulator the next instant, or in a matter of a few micro-seconds or less (FIG. 5). As the input voltage falls below the output voltage the boost converter takes over completely from the buck converter (which is working at 100% duty cycle now).

Figure 6:
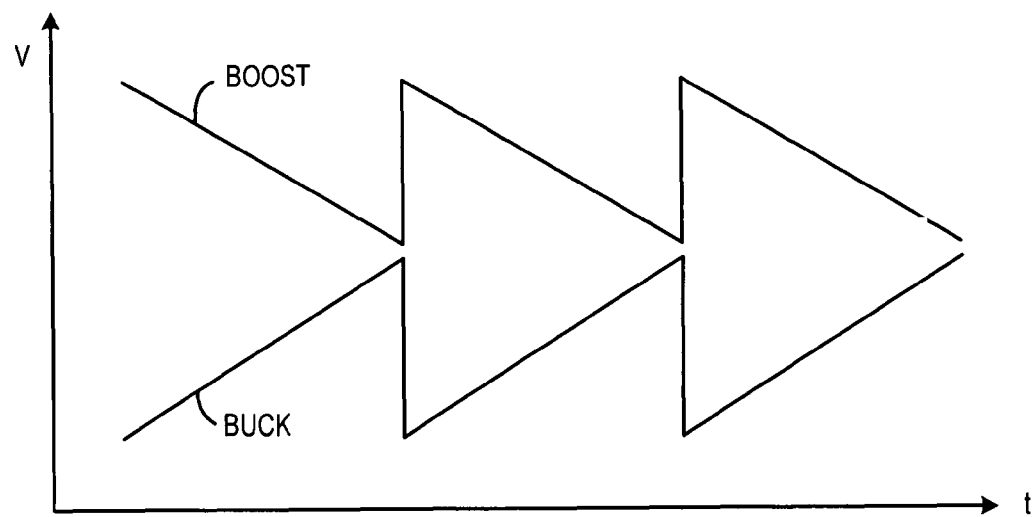
FIG. 6 shows a conceivable arrangement of slope compensation ramps in a combined peak-valley current control scheme.

To be able to go from buck operation into boost operation the modulator scheme takes advantage of the slope compensation ramps that are necessary to combat sub-harmonic oscillation in a current-mode converter. A standard peak-current modulator compares the output voltage of an error amplifier to the sum of the slope compensation ramp and a voltage that represents the inductor current to determine the timing within each operation cycle at which to switch off the buck or boost converter. In case there is no current flowing in the inductor the signal in the modulator would only consist of the slope compensation ramp. By simply stacking the ramps on top of each other, as would occur when triggering them at the same time instants, the error amplifier output can go seamlessly between the lower ramp region and the upper ramp region (see FIG. 6). If we assume that the lower ramp is used for the peak-current mode of the buck converter and the upper ramp is used for the valley-current mode of the boost converter this would correspond to going from buck operation to boost operation.

Figure 9:
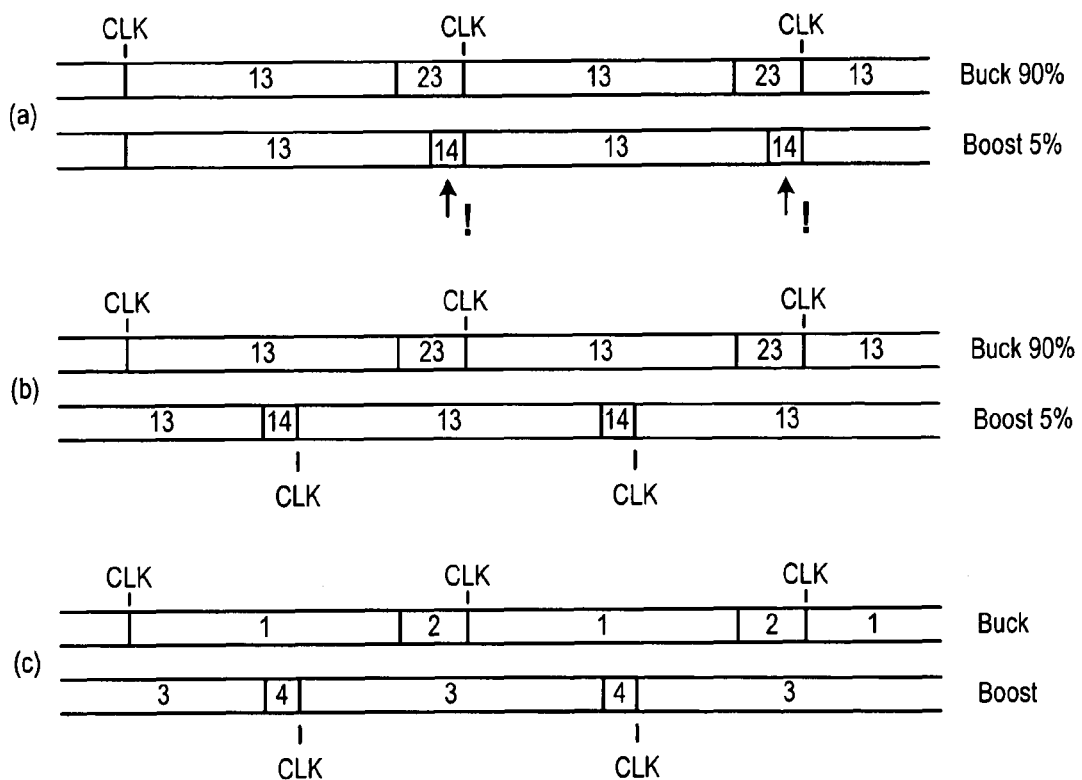
FIG. 9 shows opening and closing timings in the buck-boost converter of FIG. 2, FIG. 9(a) showing the opening and closing timings corresponding to the conceivable arrangement of FIG. 6, and FIGS. 9(b) and 9(c) showing in two different ways the opening and closing timings in the present invention.

To illustrate the problem with this conceivable arrangement, FIG. 9(*a*) shows the corresponding switching scheme if we assume a buck duty cycle of 90% and a boost duty cycle of 5%. FIG. 9 shows the closed phases of the switches S1 to S4 of FIG. 2, in a similar manner to the lower parts of FIGS. 4 and 5, except that the control for buck and boost operation is separated out.

After the clock pulse occurs, switches S1 and S3 are closed and the inductor current increases. When the buck converter reaches 90% duty cycle, switch S1 is opened and S2 is closed. If then the boost converter reaches its duty cycle, S3 would be open and S4 closed briefly (namely, for 5% of the clock period in this example, to give a boost duty cycle of 5%). This would effectively short the inductor (both ends connected to ground) and would therefore not be a practical approach, as denoted by the exclamation marks in the Figure.

Figure 7:
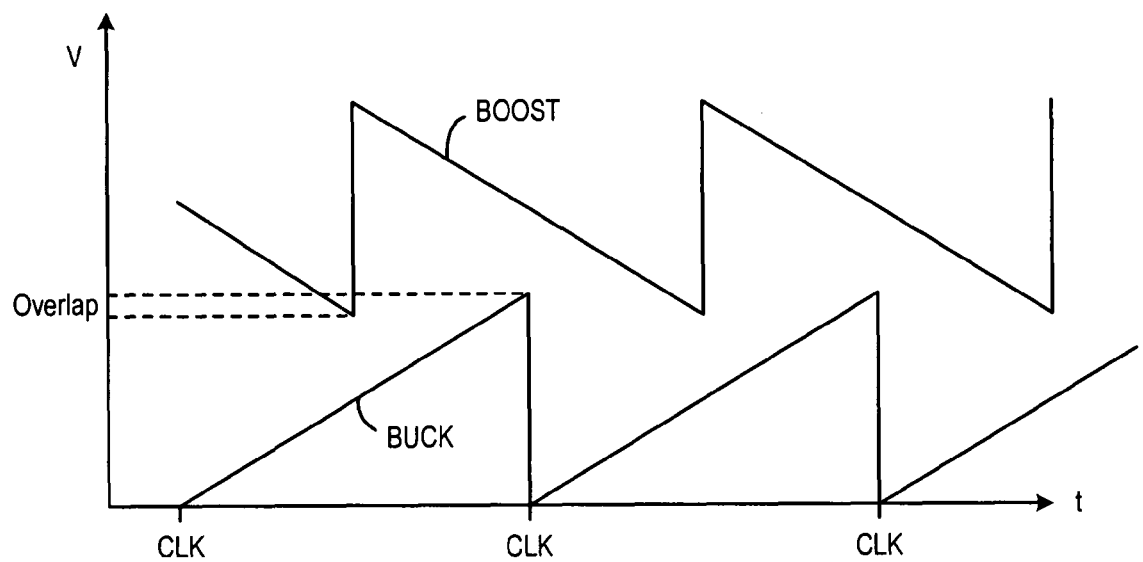
FIG. 7 shows a first arrangement of slope compensation ramps in a combined peak-valley current control scheme according to the present invention.
Figure 8:
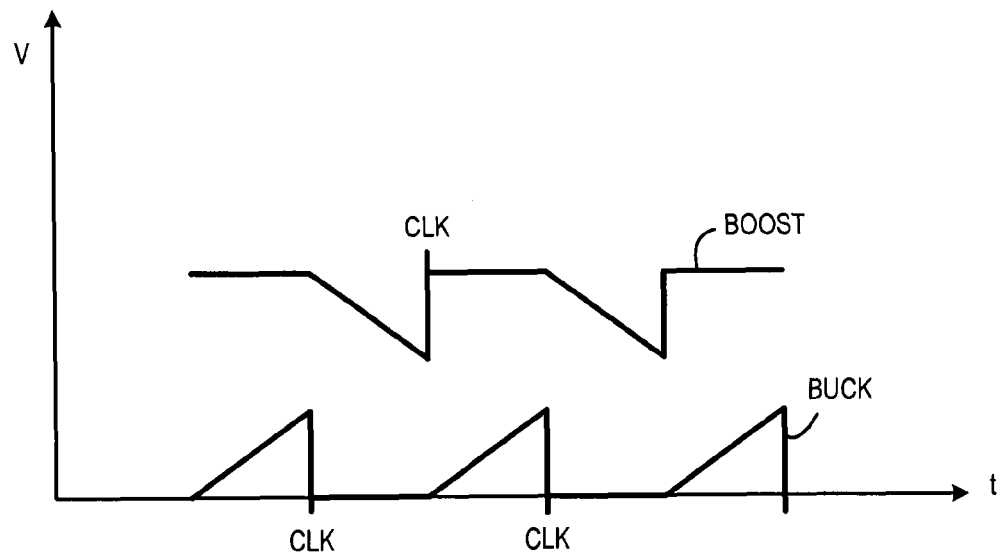
FIG. 8 shows a second arrangement of slope compensation ramps in a combined peak-valley current control scheme according to the present invention.

The solution to this problem, provided by the present invention, is illustrated by FIGS. 7 and 8, and in FIGS. 9(*b*) and (*c*). By shifting the switching cycles of the buck and boost converter by 50% with respect to each other the previous problem is avoided. Let's again assume a buck duty cycle of 90% and a boost duty cycle of 5%. At the beginning of the buck cycle switches 1 and 3 are closed ("13" in FIG. 9(*b*)). Other than before the boost converter now opens S3 and closes S4 while the buck converter still keeps S1 closed ("14" in FIG. 9(*b*), lower line). At 50% of the duty cycle of the buck converter (half-way through the clock period) the boost converter opens S4 and closes S3 again. Finally, at 90% duty cycle of the buck converter S1 is opened and S2 is closed. If we examine this scheme (FIG. 9(*b*)) and compare it to the previous one (FIG. 9(*a*)) there is no moment where the inductor is shorted, so it solves the above problem.

FIG. 9(*c*) shows the same switching scheme as FIG. 9(*b*) but with the switches separated for ease of understanding. If we examine this new switching scheme closely, one important aspect becomes clear: the peak-current control scheme of the buck converter topology only requires the inductor current to be sensed towards the end of the period during which S1 is closed, that is, just prior to closing S2. The valley-current control scheme of the boost converter requires the inductor current to be sensed towards the end of the time when S3 is closed (i.e. just before closing S4). In each case, to allow for settling time of a current sense amplifier, it is necessary to begin current sensing slightly early (e.g. by a few tens of nano-seconds for example).

The present embodiment accommodates the above requirements under the constraint that the boost duty cycle must be less than 50% when the buck converter does not operate in 100% duty cycle. A further constraint in this scheme is that the buck duty cycle needs to be more than 50% when any boost action happens. Those two constraints do not limit the scheme in practice, however. The duty cycle of a buck converter approaches 100% as the input voltage approaches the output voltage. It is only then that the boost converter starts supporting it, so the second constraint is not a problem. As the input voltage falls below the output voltage, the buck converter duty cycle is 100% and the boost converter duty cycle increases. When it reaches 50% the duty cycle of the buck converter still is at 100%, so the first constraint is no problem either.

Having said that, every time the inductor current information is required for the buck or the boost converter S1 is closed in the proposed scheme. This means that the controller of the present invention only needs to sense the current in this switch. This can be done without adding extra components so does not add cost and does not decrease efficiency.

FIGS. 7 and 8 shows two alternative configurations of the slope compensation ramps in the proposed switching scheme. In FIG. 7, a simple sawtooth waveform is used for each slope compensation ramp, these being mutually offset by half a clock cycle as already described. FIG. 8 shows a modified waveform of each slope compensation ramp in which the waveform flatlines for around half a cycle, following a clock timing, then rises or falls for the remainder of the cycle. This is possible because slope compensation is only needed for duty cycles over 50% for peak-current control schemes and below 50% for valley-current control schemes.

Although FIGS. 7 and 8 show an offset of half a cycle between the ramps, this is not essential. A mutual offset of say 40% or 60% could alternatively be provided. However, a half-cycle offset is easiest to implement, as this is simple to achieve through appropriate clock signals to the ramp generators.

Figure 10:
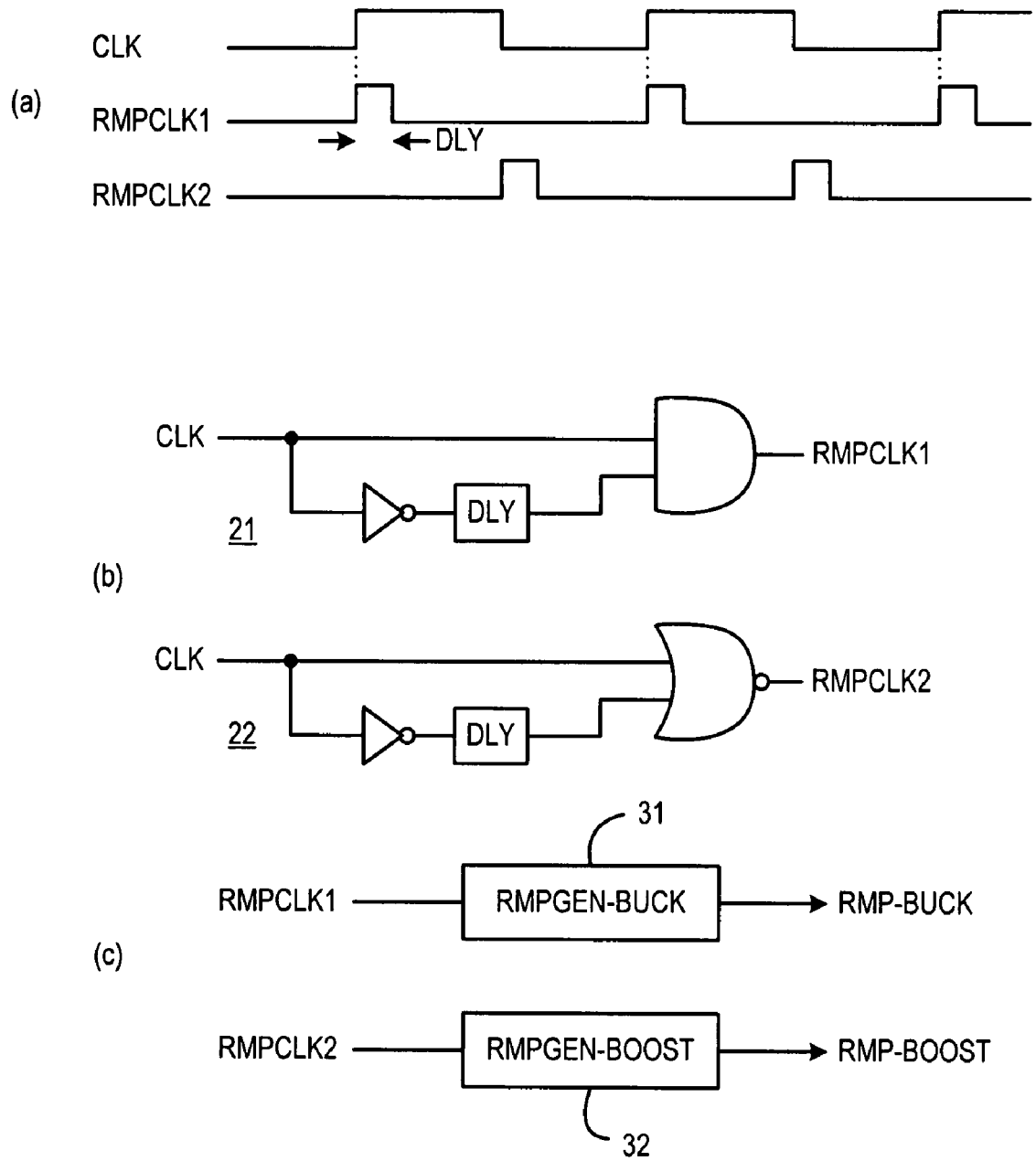
FIGS. 10(a) to (c) show details of clock signals and clock generators used in an embodiment of the present invention.

FIG. 10 shows how respective clocks for use in generating the slope compensation ramps can be simply provided from alternate edges of the same original clock. In FIG. 10(a), CLK represents the original clock, having a duty cycle of around 50%, and RMPCLK1 and RMPCLK2 are new clocks generated from this, each in the form of a brief pulse of a duration determined by the delay time of a delay element.

FIG. 10(b) shows circuits 21 and 22 for generating each of the new clocks RMPCLK1, RMPCLK2, including in the case of RMPCLK1 (circuit 21) an inverter, delay element and AND gate, and for RMPCLK2-generator circuit 22, an inverter, delay element and NOR gate.

Figure 11A:
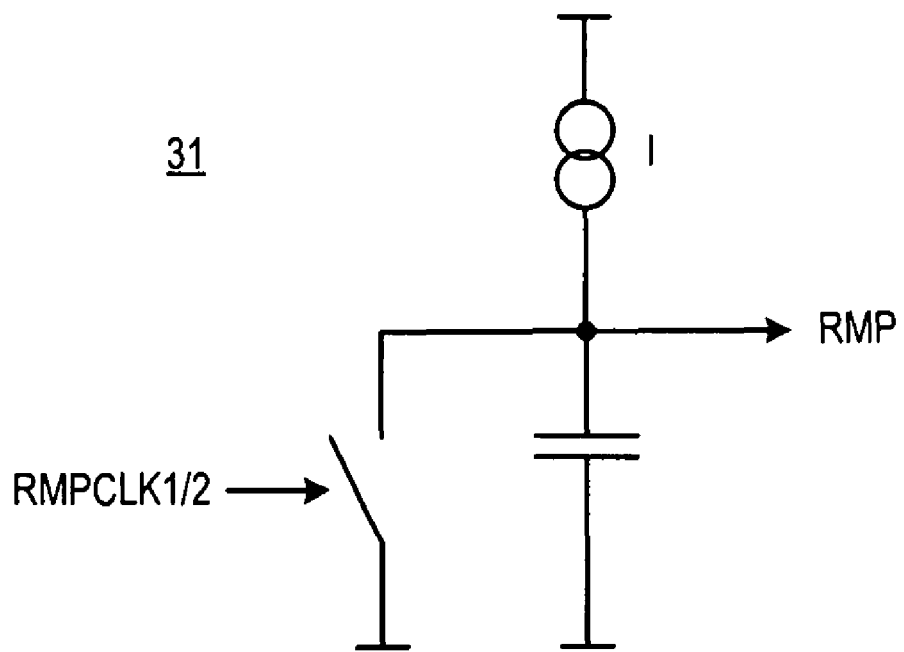
FIGS. 11(a) and (b) show a ramp generator employed in an embodiment of the present invention and an output thereof in the form of a slope compensation ramp.

As shown schematically in FIG. 10(c), the resulting clocks are fed to respective ramp generators (signal generators) 31 and 32. As mentioned, the slope compensation ramp in each case is most conveniently a sawtooth waveform such as those of FIG. 7, and a suitable circuit for providing ramp generator 31 is shown in FIG. 11. As shown here, ramp generator 31 comprises a constant-current source labeled I and connected between a positive voltage supply and an output node, a capacitor connected between the output node and ground, and a switch in parallel with the capacitor. The switch is opened and closed under control of RMPCLK1, the sawtooth ramp RMP-BUCK being output as RMP from the output node. The other ramp generator 32 would require a slightly different circuit design, as would be apparent to a person skilled in the art, since the waveform of RMP-BOOST is effectively an inverted form of RMP-BUCK.

Figure 11B:
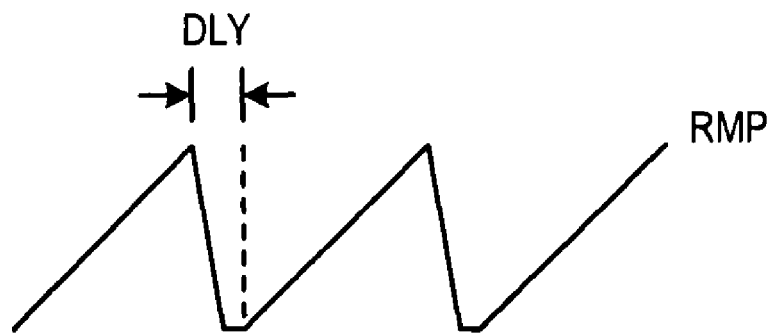

FIG. 11(b) shows the buck slope compensation ramp RMP-BUCK in a less idealised form than FIG. 7, the falling edge of the sawtooth being shorter than a certain time DLY corresponding to the delay set in the clock generator 21. The boost slope compensation ramp RMP-BOOST has a corresponding inverted shape.

Figure 12:
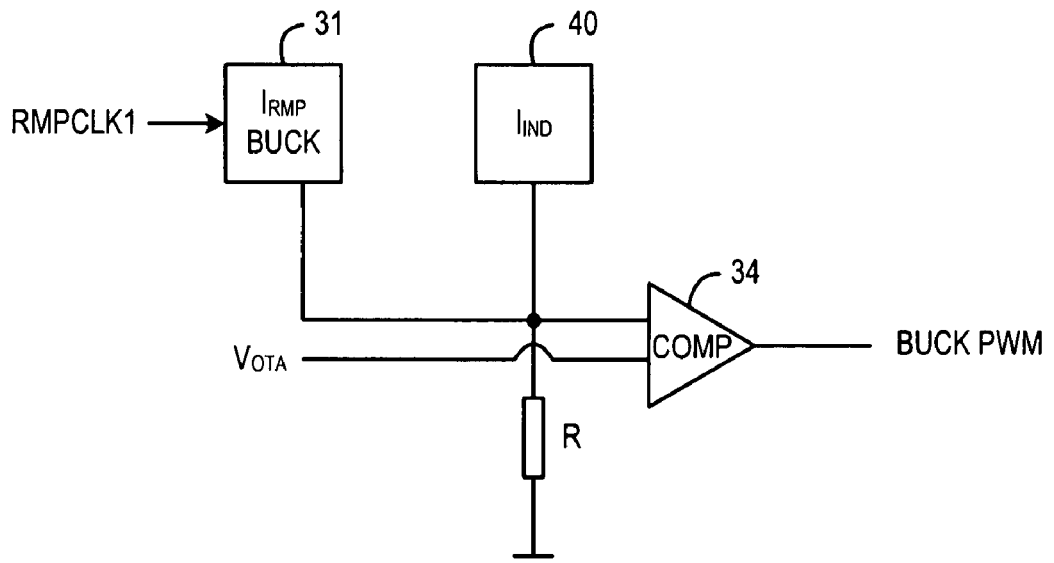
FIG. 12 shows control circuitry in a switch controller in an embodiment of the present invention.
Figure 12:
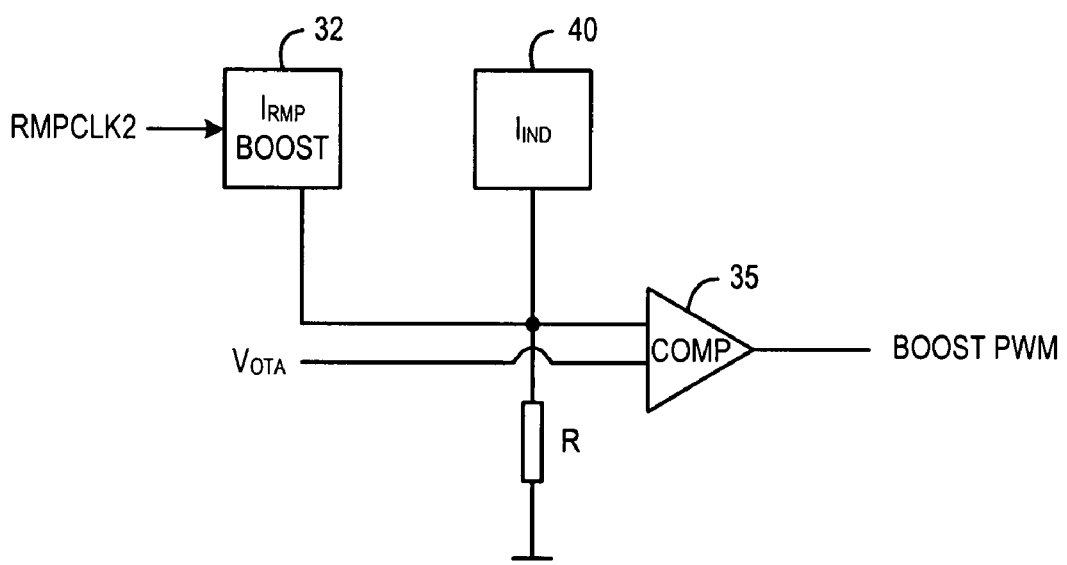

FIG. 12 shows elements of the switch controller 10 of the buck-boost converter. 31 and 32 are the ramp generators. A signal $I_{RMP}$ from each ramp generator is fed to one input of a comparator, together with a current sense signal $I_{IND}$ from a current sense circuit, indicated by 40. This may take the form, for example, of a small amplifier connected in parallel with the inductor of the buck-boost converter. Such a current sense circuit is usually provided in any current-mode DC-DC converter as a matter of course. The current sum of these signals $I_{IND}+I_{RMP}$ is converted to a voltage by providing a resistor R between the comparator input and ground. Incidentally, this voltage corresponds to the dashed line in FIGS. 4 and 5.

To the other input of each comparator 34 or 35 is fed a signal $V_{OTA}$ (also marked in FIGS. 4 and 5) derived from the output voltage $V_{out}$ (FIG. 1 or 2) of the buck-boost converter. This signal is conveniently provided by supplying both $V_{out}$ and a reference voltage to differential inputs of a transconductance amplifier (error amplifier). The comparator output in each case (BUCK PWM or BOOST PWM) is fed to driver circuits (not shown) for the switches of the buck-boost converter. In the case of a four-switch buck-boost converter as in FIG. 2, additional control logic (not shown) is used to derive separate switching signals for the switches involved in buck and boost operation, respectively.

By sensing the current in the inductor only when a given switch (S1 in the example of FIG. 2) is closed, the present invention avoids the need for additional current sensing components, and reduces the current consumption due to the current sensing. In particular, there is no need for a second current sense circuit as would otherwise be required to sense the current at times when S1 is open. This reduces the complexity of the overall circuit, and hence minimises the occupied area on an IC substrate. In addition, no matching problems can arise between two or more current sense circuits. Finally, settling time of the single current sense circuit (which may amount to 5-7% of the clock period at high frequency operation) is not particularly an issue in the present invention, as S1 remains closed well before the current sensing time. By contrast, this may well be an issue when two current sense circuits are used to sense the current in different switches.

To summarise, an embodiment of the present invention provides a controller (10) for a constant frequency current-mode buck-boost converter, the converter including an inductor (L), a first switch (SW1, S1) connected between an input terminal ($V_{in}$) of the converter and one end of the inductor (L), a diode or a switch (D1, S2), connected between the first end of the inductor and ground, a second diode or switch (D2, S3) connected between a second end of the inductor and an output terminal ($V_{out}$) of the converter, and a second switch (SW2, S4) coupled between the other end of the inductor and ground. A current sensor is also present for sensing current in the first switch (SW1, S1) as a measure of the inductor (L) current. The controller (10) comprises a feedback circuit for deriving a feedback signal from the output terminal ($V_{out}$) and a waveform generator (31, 32) for generating buck and boost slope compensation ramps (RMP-BUCK, RMP-BOOST) used for providing stability of operation in the current domain in both buck and boost operating modes of the converter. Control logic in the controller (10) generates drive signals during every clock period to repeatedly open and close the switches at individual duty cycles determined on the basis of the feedback signal, the sensed current signal and the slope compensation ramps. The buck and boost slope compensation ramps are mutually offset with respect to one another in time, for example by 50% of a clock cycle, and the control logic uses the sensed current signal only while the first switch (SW1, S1) is closed, thus avoiding the need for additional current sensing circuitry.

As mentioned in the introduction, the converter of this invention has particular application to portable hard-disk based devices, which may be called upon to run on mains power as well as on a battery voltage of varying strength. The present invention can also be used in other portable and non-portable electronic systems, including mobile comms, audio players, cameras driver circuits for LEDs, audio codecs, and many other applications.

What is claimed is:

1. A method of controlling a constant frequency current-mode buck-boost converter, the buck-boost converter including an inductor, a first switch connected between an input terminal of the converter and a first end of the inductor, a first current control means connected between the first end of the inductor and ground, a second current control means connected between a second end of the inductor and an output terminal of the converter, and a second switch coupled between the second end of the inductor and ground; the method comprising:

deriving a feedback signal from the output terminal;
sensing a signal representative of current in the inductor to provide a sensed current signal;
providing first and second ramp signals, the first ramp signal for use in controlling buck operation through at least the first switch, the second ramp signal for use in controlling boost operation through at least the second switch; and
generating drive signals to repeatedly open and close at least the first switch and second switch at individual duty cycles determined on the basis of the feedback signal, the sensed current signal and the first and second ramp signals; wherein
the first and second ramp signals are mutually offset to one another in time, in such a way as to allow said sensing step to be performed only while the first switch is closed.

2. The method according to claim 1, wherein the first and second ramp signals are mutually offset by 50% of a repetition period of operation of the switches.

3. The method according to claim 1, wherein the drive signals are adapted to perform peak-valley current mode control of the converter.

4. The method according to claim 3, wherein said sensing step is performed by sensing the current flowing in the first switch at a timing immediately before closing another said switch of the converter.

5. The method according to claim 1, which is applied during buck-boost operation of the converter with a high buck duty cycle and a low boost duty cycle.

6. The method according to claim 1, wherein each of the ramp signals is a periodic sawtooth signal, the slope of the first ramp signal being opposite to that of the second ramp signal.

7. The method according to claim 6 wherein the sloping portion of each sawtooth waveform occupies substantially the whole cycle period of the ramp signals.

8. The method according to claim 6 wherein the sloping portion of the sawtooth waveform is preceded or followed by a flat portion in each cycle.

9. The method according to claim 1, wherein said sensing step is performed using an amplifier in parallel with the first switch and the timing of performing the sensing step takes account of a settling time of the amplifier.

10. The method according to claim 1, wherein the step of deriving a feedback signal includes comparing a voltage at the output terminal with a reference voltage to provide an error voltage for use in said step of generating drive signals.

11. The method according to claim 10, wherein said step of generating drive signals includes supplying the error voltage, the sensed current signal and the first ramp signal to a buck comparator, and supplying the error voltage, the sense current signal and the second ramp signal to a boost comparator, the outputs of the buck comparator and boost comparator being processed to provide the first drive signal for buck operation and the second drive signal for boost operation.

12. A controller for a constant-frequency current-mode buck-boost converter, the converter including an inductor, a first switch connected between an input terminal of the converter and a first end of the inductor, a first current control means connected between the first end of the inductor and ground, a second current control means connected between a second end of the inductor and an output terminal of the converter, a second switch coupled between the second end of the inductor and ground, and current sensing means for sensing a signal representative of current in the inductor to provide a sensed current signal, the controller comprising:
feedback means for deriving a feedback signal from the output terminal;
a waveform generator for generating first and second ramp signals, the first ramp signal for use in controlling buck operation through at least the first switch, the second ramp signal for use in controlling boost operation through at least the second switch; and
control logic for generating drive signals to repeatedly open and close at least the first switch and second switch at individual duty cycles determined on the basis of the feedback signal, the sensed current signal and the first and second ramp signals; wherein
the waveform generator is arranged to provide the first and second ramp signals mutually offset with respect to one another in time; and
the control logic is arranged to employ the sensed current signal only while the first switch is closed.

13. The controller according to claim 12, wherein the waveform generator is arranged to generate the first and second ramp signals mutually offset by 50% of a repetition period of operation of the switches.

14. The controller according to claim 12, wherein the waveform generator is arranged to generate each of the ramp signals in the form of a periodic sawtooth signal, the slope of the first ramp signal being opposite to that of the second ramp signal.

15. The controller according to claim 12, wherein the feedback means includes means for comparing a voltage at the output terminal with a reference voltage to provide an error voltage.

16. The controller according to claim 15, wherein the control logic includes a buck comparator arranged to receive the error voltage, the sensed current signal and the first ramp signal and a boost comparator arranged to receive the error voltage, the sensed current signal and the second ramp signal, and drive circuitry responsive to the outputs of the buck comparator and boost comparator to provide the first drive signal for buck operation and the second drive signal for boost operation.

17. A constant-frequency current-mode buck-boost converter comprising an inductor, a first switch connected between an input terminal of the converter and a first end of the inductor, a first current control means connected between the first end of the inductor and ground, a second current control means connected between a second end of the inductor and an output terminal of the converter, a second switch coupled between the second end of the inductor and ground, and an inductor current sensing means, and further comprising the controller according to claim 12.

18. The current-mode buck-boost converter according to claim 17, wherein the inductor current sensing means comprises an amplifier in parallel with the first switch and the control logic is arranged to receive the current sense signal at a timing which takes account of a settling time of the amplifier.

19. A system incorporating the current mode buck-boost converter according to claim 17.

20. The system according to claim 19, wherein the system is a portable electronic device.

21. The system according to claim 19, wherein the system is a hard-disk based electronic device.

* * * * *